(12) United States Patent
Gentry

(10) Patent No.: US 6,453,162 B1
(45) Date of Patent: Sep. 17, 2002

(54) METHOD AND SYSTEM FOR SUBSCRIBER PROVISIONING OF WIRELESS SERVICES

(75) Inventor: William David Gentry, Cary, NC (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/209,127

(22) Filed: Dec. 10, 1998

(51) Int. Cl.[7] ................................................. H04Q 7/20
(52) U.S. Cl. ...................... 455/433; 455/414; 455/435; 455/422; 455/445; 455/466; 455/432
(58) Field of Search ................................ 455/433, 432, 455/422, 403, 414, 435, 445, 466, 411, 456; 379/219, 220

(56) References Cited

U.S. PATENT DOCUMENTS

| | | | | |
|---|---|---|---|---|
| 5,845,211 A | * | 12/1998 | Roach, Jr. | 455/436 |
| 5,950,130 A | * | 9/1999 | Coursey | 455/432 |
| 5,999,973 A | * | 12/1999 | Glitho et al. | 709/223 |
| 6,011,975 A | * | 1/2000 | Emery et al. | 455/456 |
| 6,088,594 A | * | 6/2000 | Kingdon et al. | 455/457 |
| 6,131,095 A | * | 10/2000 | Low et al. | 707/10 |
| 6,157,831 A | * | 12/2000 | Lamb | 455/433 |
| 6,181,935 B1 | * | 1/2001 | Gossman et al. | 455/433 |
| 6,201,965 B1 | * | 3/2001 | Mizell et al. | 455/433 |
| 6,205,139 B1 | * | 3/2001 | Voit | 370/389 |
| 6,223,035 B1 | * | 4/2001 | Pierce et al. | 455/433 |
| 6,226,523 B1 | * | 5/2001 | Karlsson et al. | 455/466 |
| 6,269,244 B1 | * | 7/2001 | Alperovich et al. | 455/433 |

FOREIGN PATENT DOCUMENTS

| | | |
|---|---|---|
| EP | 0 758 835 A2 | 2/1997 |
| WO | WO98/44747 | 10/1998 |

\* cited by examiner

Primary Examiner—Edward F. Urban
Assistant Examiner—Marceau Milord
(74) Attorney, Agent, or Firm—Withrow & Terranova, P.L.L.C.

(57) ABSTRACT

A method and system for provisioning a wireless component over an internet protocol network. A request to modify information in a location register is received from an input device coupled to an internet protocol network. The request is converted into an HLR access message. The HLR access message is sent to the location register, and information is modified in the location register in response to the HLR access message.

22 Claims, 4 Drawing Sheets

METHOD AND SYSTEM FOR SUBSCRIBER PROVISIONING OF WIRELESS SERVICES

FIELD OF THE INVENTION

This invention generally relates to wireless communications, and in particular relates to subscriber provisioning of wireless services.

BACKGROUND OF THE INVENTION

Wireless service fees have decreased significantly because of competition among wireless providers. This has resulted in wireless phones becoming ubiquitous, and basic service becoming a commodity. As service fees bottom out, wireless service providers distinguish their offerings through means other than rates, such as by offering supplementary features such as call forwarding, caller identification, voice messaging, and other features or options that another provider does not offer, or does not offer at a competitive cost.

Typically a subscriber chooses the various features they want, such as caller identification or call forwarding, when service is initially established with a wireless service provider. Such features are typically charged at an additional fee on top of basic service, and can be very profitable for the wireless service provider. The service is implemented by an employee of the wireless provider who provisions a home location register with the information associated with the particular subscriber in the form of a profile. The home location register (HLR) is a database that contains records, or profiles, about each subscriber for which the HLR acts as the servicing HLR. The appropriate billing center is also notified of the subscriber and any ancillary features so that the subscriber is properly billed.

An HLR is typically provisioned by a wireless provider employee via some type of direct-connect device, such as a terminal, which translates the particular provisioning command into one or more HLR access messages. Upon receiving the HLR access message(s), the HLR updates the appropriate profile. Consequently, provisioning an HLR involves labor and other resources of the wireless provider.

If, after a subscriber profile has been initially created and provisioned in the HLR, the subscriber later wishes to add or cancel certain features, the wireless provider must be notified of the desired changes, and provider resources are again allocated to provision the HLR. This is relatively costly to the provider in terms of labor costs. Thus, it would be desirable to a wireless provider if a subscriber could provision their profile in the HLR directly, reducing labor costs of the wireless provider.

The ability for a subscriber to directly provision a wireless component, such as an HLR, may create a demand for additional features, and result in additional revenues for the provider. For example, one such feature could be to allow a wireless subscriber to provision a local number on an HLR associated with a remote area for use by the subscriber when in the remote area. Such a feature would reduce toll charges for the subscriber, and the wireless service provider would generate additional fees. For example, assume a subscriber having wireless service in Cincinnati travels to Chicago. If an individual in Chicago attempts to phone the subscriber by dialing the Cincinnati phone number of the subscriber's wireless phone, the phone call is first routed to Cincinnati, then back to Chicago, resulting in toll charges for both the individual and the subscriber. To eliminate these toll charges, the subscriber could request from a Chicago service provider a temporary local number for use in Chicago. However, to accomplish this, the subscriber must determine ahead of time what wireless providers provide service in Chicago, choose one of the providers, call the provider, determine if the fee for the service is acceptable, and if so provide the appropriate billing and other information to the provider. The wireless service provider in Chicago allocates labor resources to field this call, obtain billing information, and provision its HLR with the proper information necessary to provide the subscriber with a local phone number. This process is time-consuming, it requires the subscriber to determine what companies offer wireless service in a remote location, and it requires the subscriber to contact the provider on what could be very short notice. Consequently, wireless subscribers frequently determine that this process is more trouble than it is worth. Thus, it is apparent that it would be desirable to provide a mechanism for subscriber provisioning of wireless services.

SUMMARY OF THE INVENTION

According to one embodiment of the present invention, a method and system for subscriber provisioning of wireless services is provided. Provisioning requests made by a subscriber are received by a World Wide Web (WEB) server, packaged into one or more HLR access messages, such as IS-41 or GSM MAP messages, suitable for provisioning a wireless component in accordance with the request, transported over an internet protocol network, and delivered to a wireless gateway server. The gateway server strips off the internet protocol transport data, adds message transfer part (MTP) transport data, and forwards the HLR access message to the appropriate wireless component, such as a home location register (HLR). The HLR receives the HLR access message, implements the appropriate modifications in accordance with the HLR access message, and generates a response using the MTP protocol. The wireless gateway server receives the response, strips off the MTP transport data, adds the appropriate internet protocol transport data, and forwards the message to the WEB server, which in turn formats the message into an HTML page and sends it to the computer from which the request originated. The present invention allows a subscriber to provision a wireless component without time-consuming interaction with an employee of the service provider, allows the service provider to generate a user-friendly interface to inform subscribers of services and their cost, and reduces service provider labor costs associated with provisioning a wireless component.

According to another embodiment of the present invention the HLR is coupled to an internet protocol network, and the HLR access message is sent using the internet protocol transport directly to the HLR, eliminating the need to use the MTP protocol and a wireless gateway server.

According to one embodiment of this invention, an HTML page is communicated from a WEB server to a computer coupled to an internet protocol network. A WEB browser receives and displays the HTML page to an individual interested in obtaining a wireless service. The individual requests one or more services through point-and-click interaction with the browser, and the WEB server generates one or more HLR access messages, such as IS-41 or GSM MAP messages, suitable to provision a wireless component in accordance with the request. The HLR access message(s) is communicated to the wireless component, directly or indirectly, which then modifies the appropriate information to implement the request. The wireless component can automatically generate a billing record and send the record to a billing system that is in communication with the internet protocol network to ensure the subscriber is properly billed for the service.

According to another embodiment of the present invention a subscriber can provision a wireless component associated with a remote service area to obtain a local number for use by the subscriber when the subscriber is in the remote service area. An HTML page is communicated from a WEB server to a computer and displayed to the subscriber. The subscriber uses a WEB browser to enter relevant information, such as a date range during which the local number will be used by the subscriber, and billing information of the subscriber, in the HTML page. The information entered by the subscriber is then sent to the WEB server. The WEB server can then generate the appropriate HLR access message(s) to carry out the subscriber's request and send it to a wireless component, such as an HLR or a mobile telephone switching office (MTSO). The HLR access message(s) provision the HLR or MTSO to activate a local telephone number for use by the subscriber during the specified dates. The local number is then returned to the computer for display to the subscriber. The subscriber can record this local number, and provide the telephone number to individuals located in the remote area for use while the subscriber is in the remote area. The use of the local number eliminates toll calls that would otherwise be incurred by both the caller and the subscriber.

According to yet another embodiment of the present invention, a system for provisioning a location register over an internet protocol network is provided. A receiving module is operable to receive from an input device coupled to an internet protocol network a request to modify information in a location register. A conversion module coupled to the receiving module is operable to convert the request into at least one HLR access message, and a location register or a MTSO is operable to modify information in the location register in response to the at least one HLR access message.

Still other advantages of the present invention will become apparent to those skilled in this art from the following description wherein there are shown and described preferred embodiments of this invention. As will be realized, the invention is capable of other different obvious aspects all without departing from the invention. Accordingly, the drawings and description will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings.

Reference will now be made in detail to present preferred embodiments of the invention, examples of which are illustrated in the accompanying drawings, wherein like numerals indicate the same elements throughout the views.

DETAILED DESCRIPTION

Figure 1:
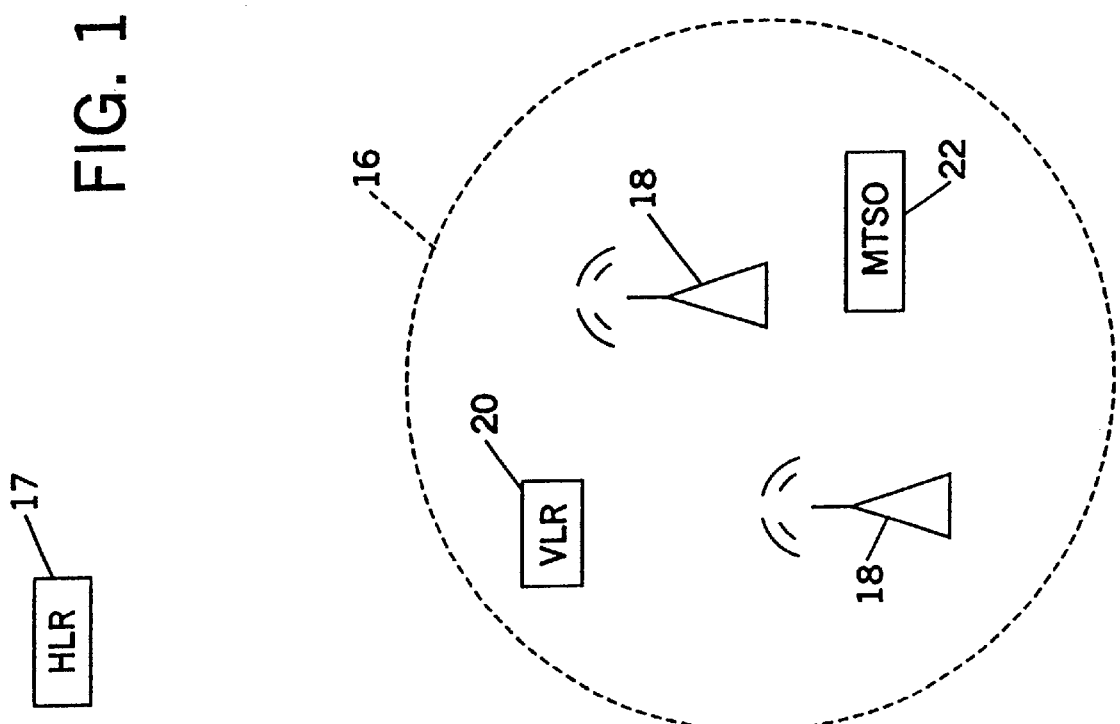
FIG. 1 is a diagram of a wireless communications system in which the present invention can be incorporated.
Figure 1:
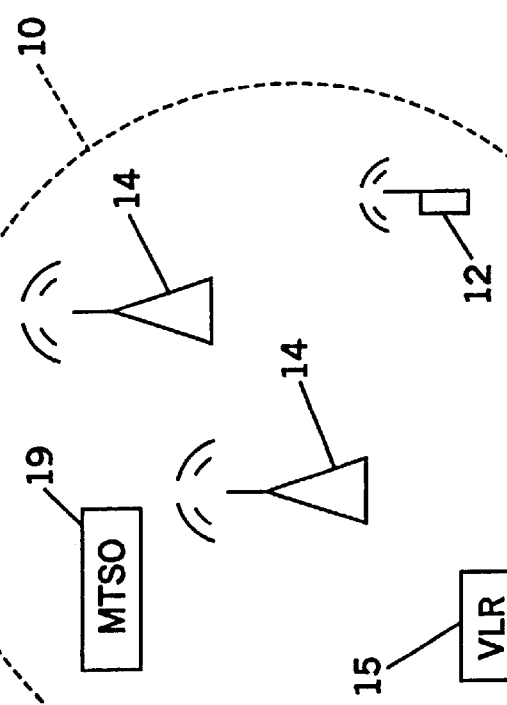

Referring now to the drawings, FIG. 1 is a diagram showing two geographic areas serviced by different wireless service providers. A first provider services wireless subscribers in a service area 10. A plurality of base stations 14 are located in service area 10, and are responsible for transmissions with a cellular subscriber station (CSS) 12. While only two base stations 14 are illustrated in FIG. 1, it will be appreciated that a service area 10 can have any number of such base stations. The subscriber station 12 can comprise any wireless device, including, for example, an analog or digital cellular phone, or a pager. When subscriber station 12 initiates or receives a telephone call, a central controller, e.g. mobile telephone switching office (MTSO) 19, determines which base station 14 should participate in transmissions with subscriber station 12. MTSO 19 acts as a controller of base stations 14, and provides the interface between the base stations 14 and the public switched telephone network (PSTN), if necessary.

During wireless transmissions, such as during a cellular phone call, subscriber station 12 may be moved within service area 10 such that subscriber station 12 is closer to another base station 14 than it is to the base station 14 originally designated to handle the phone call. When this occurs, a process referred to as a 'hand off' is initiated, controlled by MTSO 19, that results in the connection being transferred from one base station 14 to another base station 14.

Information about each subscriber of a particular service provider is maintained in a Home Location Register (HLR) 17. An HLR is essentially a database that stores information about each subscriber for which the HLR serves as the 'home' HLR. The information associated with any particular subscriber is typically maintained in a record referred to as a 'profile', which includes such information as the mobile identification number (cell phone number), what features or services are associated with the subscriber, such as call forwarding, call waiting, or caller identification, for example, and billing information associated with the cellular subscriber. Each service area also maintains a Visitor Location Register (VLR), such as VLR 15, which is a database that maintains a temporary copy of the profile of any active subscriber within the respective service area.

A home location register, such as HLR 17, communicates with other components, such as MTSO 19, using an HLR access protocol, such as IS-41 or GSM MAP messages. GSM MAP and IS-41 messages are routed using signaling system number 7 (SS7). GSM MAP, IS-41, and SS7 messaging are well known to those skilled in the art, and will not be discussed in detail herein.

When subscriber station 12 is powered up in service area 10 its mobile identification number (MIN) is broadcast to MTSO 19. MTSO 19 checks VLR 15 to determine if VLR 15 contains a profile for subscriber station 12. If not, MTSO 10 determines the HLR associated with subscriber station 12 from the MIN, and accesses HLR 17 via an HLR access message, such as an IS-41 or GSM MAP message, to obtain the subscriber profile for subscriber station 12. Upon receipt of the profile, MTSO 19 stores the profile in VLR 15. MTSO 19 can then provide services to subscriber station 12

A cellular subscriber station can be used in service areas other than the service area in which the station was originally provisioned. For example, if subscriber station 12 is powered up in service area 16, which is controlled by MTSO 22, MTSO 22 checks VLR 20 to determine if VLR 20 contains a profile for subscriber station 12. Since subscriber station 12 is unknown to VLR 20, VLR 20 will initiate an HLR access message, such as an IS-41 registration notification message, to the home location register associated with subscriber station 12, in this example HLR 17, to inform HLR 17 of the location of subscriber station 12 and to obtain the profile associated with subscriber station 12. HLR 17 will record this information, and initiate an HLR access message, such as an IS-41 registration cancel message, to VLR 15, to notify VLR 15 that subscriber station 12 is no longer in service area 10. Thus, HLR 17 maintains location information about subscriber station 12, and coordinates the activity of visitor location registers with respect to subscriber station 12. After VLR 20 obtains the profile of subscriber station 12, base station 18 will allow subscriber station 12 to participate in phone calls within service area 16.

The features subscribed to by a cellular subscriber, such as caller identification or call forwarding, are stored in the HLR profile associated with the subscriber station, and also temporarily stored in the proper VLR associated with the service area in which the subscriber station is currently located, as discussed above. The respective MTSO then implements the features as appropriate. Thus, in order to provide a cellular subscriber with enhanced service features, the profile in the HLR must be provisioned to associate those features with the subscriber station. Typically, an HLR is provisioned by an employee of the wireless service provider via a terminal device coupled to the HLR. Consequently, adding, deleting, or otherwise modifying a subscriber's profile results in increased costs to the service provider. On the other hand, since each service feature can be priced separately, the activation of features can result in increased revenue for the service provider.

Figure 2:
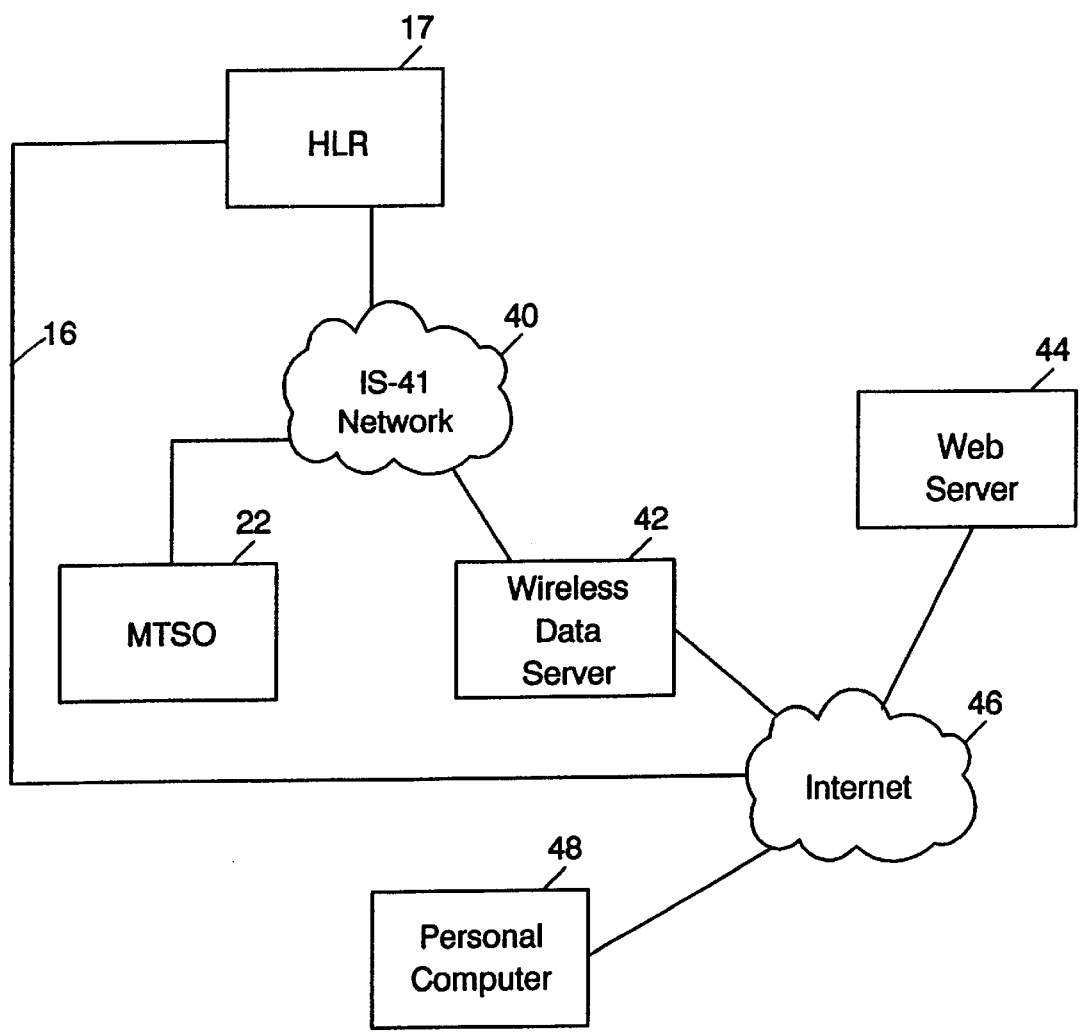
FIG. 2 is a block diagram showing aspects according to one embodiment of the present invention.

FIG. 2 is a diagram showing components of a system according to one embodiment of the present invention for enabling subscriber provisioning of a wireless component. A subscriber who wishes to provision an HLR 17 is present at a personal computer 48. Upon request, server 44 generates and transmits an HTML page to personal computer 48. WEB server 44 and personal computer 48 are each coupled to an internet protocol network 46, such as the Internet. Thus, communications between the two computers is preferably via the internet protocol transport. Connections to the Internet are practically ubiquitous, and the present invention allows a subscriber to provision a location register from any computer that has access to the Internet. The initial request could comprise, for example, the user entering in a browser executing on personal computer 48 a uniform resource locator (URL) associated with WEB server 44 that identifies an HTML page associated with HLR 17. WEB server 44 can respond with an HTML page, displayed on personal computer 48, that requires the user to enter a usercode and password, if authentication is desired. After the user is authenticated, WEB server 44 can respond with an HTML page that lists the various provisioning options associated with HLR 17. This information can be maintained in a table residing on WEB server 44.

Figure 3:
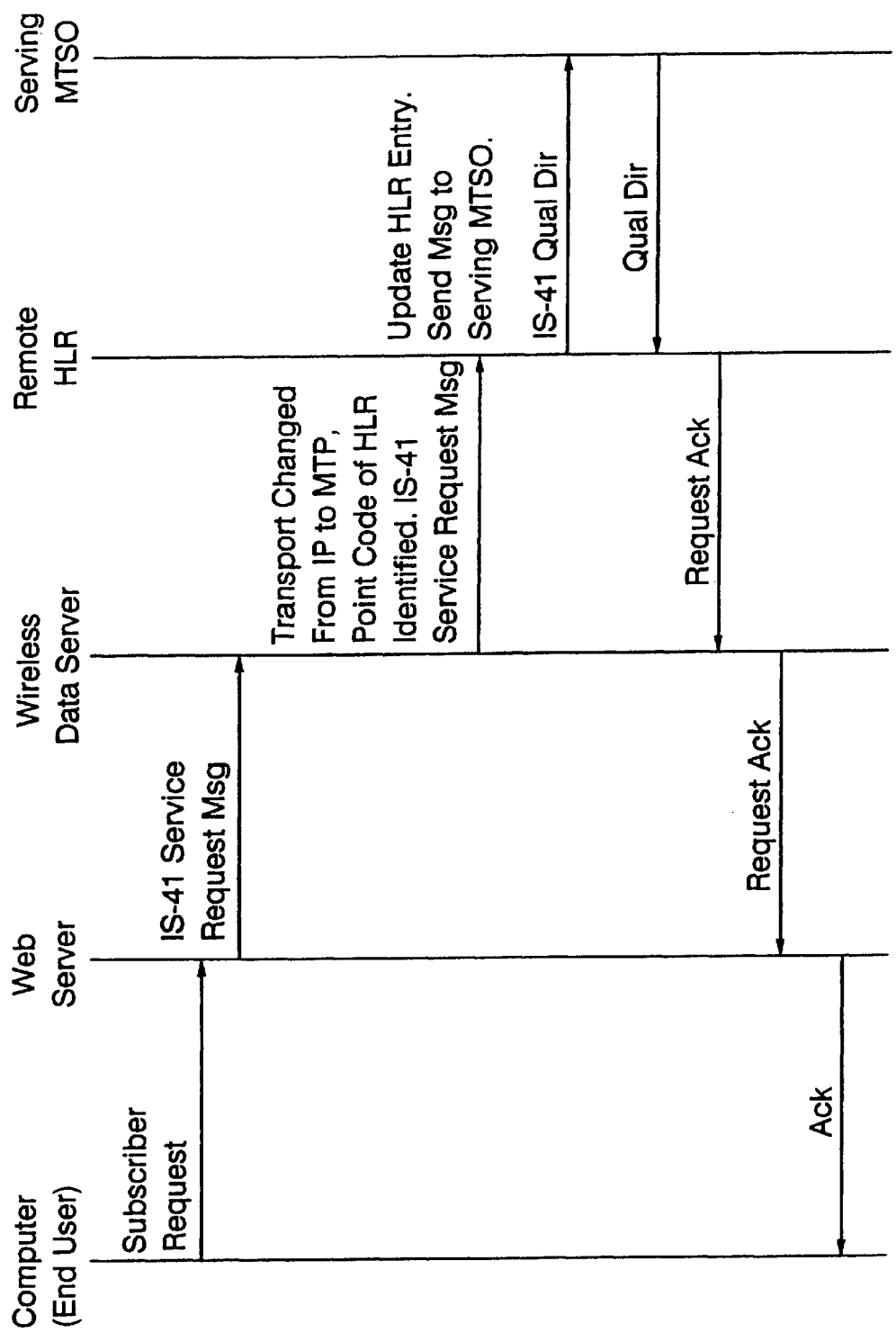
FIG. 3 is a message sequence diagram showing a sequence of messages for provisioning an HLR of a subscriber via the Internet, according to one embodiment of the present invention.

The user can select the service features that he would like activated, such as caller identification. A program executing on WEB server 44 receives this request (through, for example, the common gateway interface), and generates one or more HLR access messages, such as IS-41 messages, suitable for directing HLR 17 to activate the functions requested by the user. The IS-41 messages are packaged in the internet protocol for transmission over the internet protocol network, and then sent to wireless data server 42. Wireless data server 42 is preferably coupled to both the internet protocol network 46, as well as the respective HLR access network, such as IS-41 network 40. Wireless data server 42 determines the appropriate point code of HLR 17, strips off the internet protocol transport data and replaces it with the message transfer protocol (MTP) transport data, which is used to transport IS-41 messages over the IS-41 network 40. The message is then sent to HLR 17, which carries out the provisioning identified in the IS-41 message. HLR 17 can then generate and send a response to wireless data server 42, which can remove the MTP transport data layers and send the response using the internet protocol transport layers over internet protocol network 46 to WEB server 44. The response can be translated by WEB server 44, or sent as received to the user. FIG. 3 is a message sequence diagram illustrating a flow of messages for updating the HLR of a subscriber via the Internet.

While interaction with a wireless data server 42 is useful for provisioning a conventional HLR over an internet protocol network, according to another embodiment of this invention, an HLR includes the necessary software and network adapter, such as an Ethernet transceiver, for connecting directly to internet protocol network 46, as illustrated by connection 16. In such instance, WEB server 44 can communicate an internet protocol packet containing an IS-41 message directly to HLR 17, obviating the need for wireless data server 42, and the use of the MTP transport.

According to yet another embodiment of this invention, a remote HLR, or other wireless component, such as a mobile telephone switching office (MTSO) is provisioned over an internet protocol network to obtain a local number for use by a subscriber while in a remote service area. Any suitable user interface can be used to interact with the subscriber. For example, WEB server 44 can generate and send to personal computer 48 a map of a particular country, such as the United States, delineating the separate states. The subscriber selects, such as via a mouse pointer, a particular state or region in which the subscriber desires a local number. Upon determining what state the subscriber identified, WEB server 44 can generate another image, such as an image of the outline of the selected state, delineating cities or counties within the state. This selection process can continue until the user selects an area serviced by one or more wireless service providers. If more than one service provider services a respective area, a list of such providers, with a 'link' for each provider, can be displayed. Upon selection of any particular provider link, a page associated with that respective provider can be displayed. Each provider can design its HTML pages such that a user can obtain information about available services, including costs.

According to one embodiment of this invention, a subscriber desires to obtain a local number for use in a remote location serviced by a wireless provider. For example, a subscriber provisioned for wireless service in Cincinnati may be travelling to Raleigh for a week. The subscriber may be aware that individuals in Raleigh will need to contact the subscriber when he is travelling in Raleigh. If such a caller dials the subscriber's permanent mobile identification number, the call will be routed to Cincinnati, where the HLR of the subscriber's provider will be consulted to determine the current location of the subscriber. The HLR will indicate that the subscriber is currently in Raleigh, and the call will then be routed back to Raleigh. Both the caller and the subscriber will incur long distance toll charges. It would be desirable for the subscriber to obtain a temporary local number for use while he is in Raleigh, to eliminate both toll charges. Currently, to accomplish this, the subscriber must identify a wireless service provider in Raleigh, call the provider, determine if the provider's charge for a temporary number is acceptable, and if so, provide billing information to the provider. Because this process is time-consuming, and locating and identifying a wireless provider that offers this service at a cost the subscriber finds acceptable is difficult, subscribers rarely go through this process. Instead, they pay the long distance toll charges.

According to the present invention, as discussed above, a subscriber can merely request a list of all wireless providers serving a particular area, browse the information provided by the participating providers, and select a particular provider. An HTML page can be presented to the subscriber requesting certain information. The subscriber can enter the dates during which he will be in the remote location, provide billing information, such as a credit card number, and provide whatever additional information the service provider needs to provide the subscriber with a local number during the specified period of time.

Upon receipt of this information, one or more HLR access messages, such as IS-41 or GSM MAP messages, can be generated at WEB server 44, packaged in one or more internet protocol packets, and communicated to wireless data server 42. Wireless data server 42 can then strip off the internet protocol information, package the IS-41 messages into one or more MTP packets, and send the MTP packet(s) to the wireless component associated with the service provider, such as HLR 17 or MTSO 22. This information can then be used to provision either HLR 17 or MTSO 22, as implemented by the provider. A billing record can be generated and communicated to a billing application, and a local number can be obtained and returned to the subscriber via WEB server 44 and personal computer 48. The subscriber can record the local telephone number, and provide it to the appropriate individuals in Raleigh.

Such remote provisioning of a local number and subsequent call processing can be implemented in a variety of ways. At provisioning time, HLR 17 can receive the service request, obtain a local number from a pool of numbers maintained for this purpose, return the local number to the subscriber and provide the local number and MIN of the subscriber to MTSO 22. In this scenario, during call processing, when a call is placed to the local number, MTSO 22 looks the number up in a table maintained in MTSO 22, and based on the corresponding MIN, places the call to the subscriber. Another way to implement such functionality would be to require MTSO 22 to interact with HLR 17 during call processing to determine how to handle the call. In this scenario MTSO 22 and HLR 17 maintain a pool of the same numbers for use as temporary local numbers. During provisioning time, HLR 17 allocates a number from the pool and returns the allocated number to the subscriber. During call processing time, when a call is placed to the allocated local number, MTSO 22 recognizes that the called number is a member of the set of preallocated local numbers, and interacts with HLR 17 to determine how to process the call.

The present invention is not limited to any particular user interface, and thus the interface used is primarily an implementation consideration. Additionally, although the invention has been described solely in terms of sending HLR access messages to a wireless component for the purpose of provisioning the HLR, the invention is not so limited and WEB server 44 could also generate and send HLR access messages that query a wireless component, such as the home HLR of the subscriber, so that the current status of a subscriber's account could be displayed for the subscriber.

Figure 4:
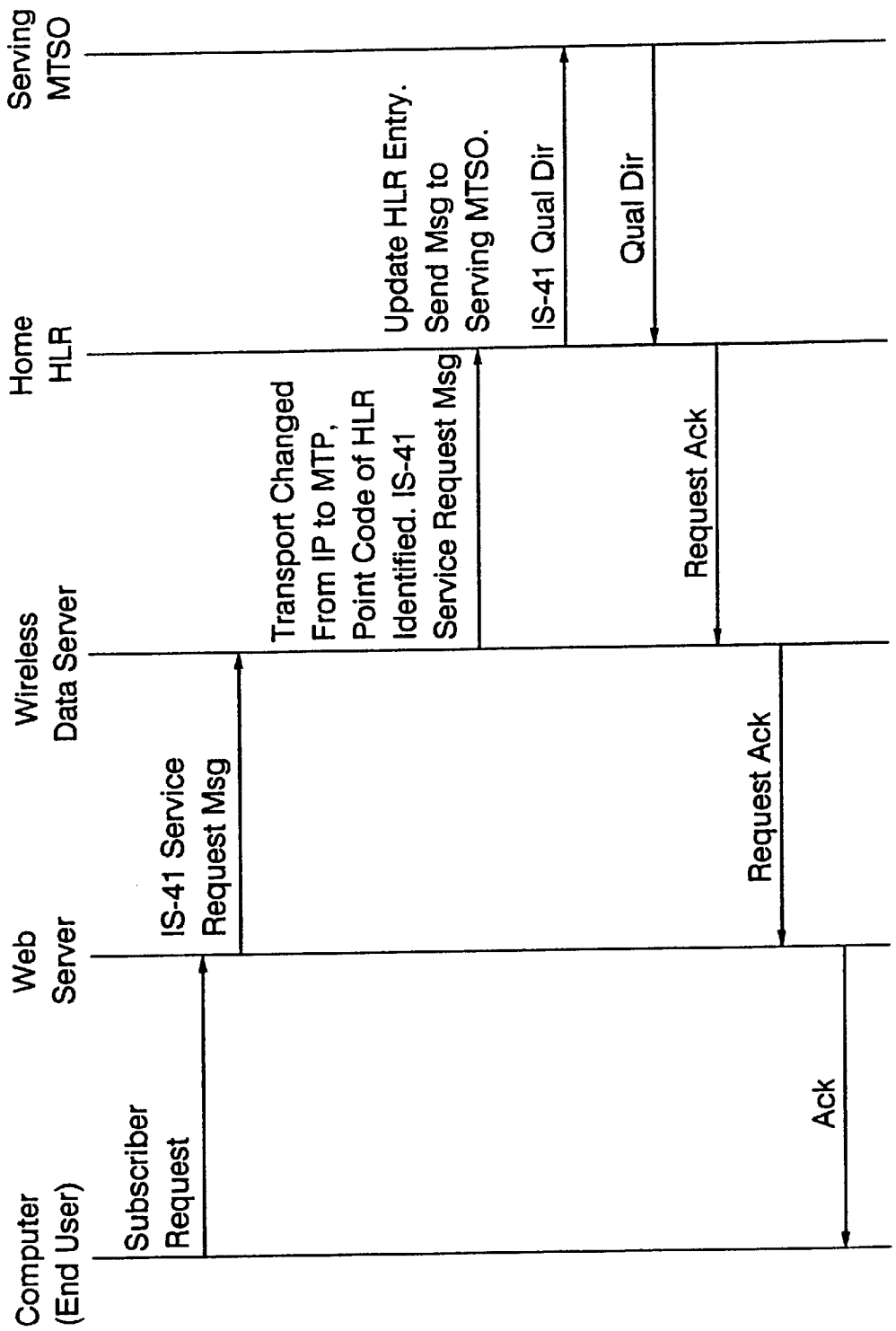
FIG. 4 is a message sequence diagram showing a sequence of messages for obtaining a local number for use in a remote area, according to one embodiment of the present invention.

FIG. 4 is a message sequence diagram showing a flow of messages suitable for implementing one embodiment of the invention. The message flow begins when a subscriber uses a WEB browser to enter subscriber information associated with obtaining a local number for use in a remote location. The WEB browser sends this subscriber request to the WEB server in an internet protocol message. The WEB server receives this message, and based on the content of the message generates one or more HLR access messages. For the purpose of this example, it will be assumed that the HLR is provisioned via the IS-41 messaging protocol. The IS-41 messages are sent by the WEB browser to the wireless data server. The wireless data server uses the message to determine the point code of the HLR of the remote service provider, changes the transport from IP to MTP, and sends the message to the appropriate HLR. If the service is implemented such that the MTSO handles call processing without interacting with the HLR, the HLR can send an IS-41 message to the MTSO indicating the local number and mobile identification number of the subscriber for use during call processing. This step would not be required where the MTSO interacts with the HLR during call processing. Each component acknowledges the request, and a message is returned to the subscriber via the WEB server identifying the allocated local number for use by the subscriber while in the remote area.

A message format suitable for accomplishing the provisioning of a remote HLR for a local number could be as follows:
Message Type:
  Service_Request
Service:
  Roaming_DN
Options:
  Mobile_Identification_Number (10 digits)
  Current_timestamp (time)
  Activation_time (time)
  Duration (number of hours, or, indefinite)
  Billing_reference (integer number)
  Originating_device (IP address of WEB server)

While the message format is illustrated in an IS-41 type message format, it is apparent that a similar type message could be provided for other HLR access protocols, such as GSM MAP. The Roaming_DN field identifies the message as a new service request type message. The mobile_identification_number field identifies the wireless device that will be used in the remote area. The current_timestamp field indicates the time the request was made. The activation_time field identifies the date and time when the local number will be available for use. The duration field indicates the duration, for example by indicating a number of hours, that the local number will be activated for the subscriber. The billing_reference field can be a key used by a downstream processor for purposes of billing the subscriber. The originating_device field can identify the internet protocol address of the WEB server from which the Service Request originated.

A response message could have the following format:
Message Type: Service_Request_Response
Service: Roaming_DN
Status: ACK or NACK
Information: <10 digit dn>

The status field indicates an acknowledgment or failure to acknowledge the message. The information field can contain a 10 digit directory number (telephone number) for use by the subscriber while in the remote area.

It is apparent that the exemplary service request and response provided above merely illustrate one type of request and response message format that could be used to implement the desired service. Any other message format could be used that communicates the appropriate information between the components.

The foregoing description of preferred embodiments of the invention has been presented for purposes of illustration and description. It is not intended to be exhaustive or to limit the invention to the precise form disclosed. Obvious modifications or variations are possible in light of the above teachings. For example, while HLRs, VLRs, and MTSOs have been referred to as separate components, it is common for such components to be integrated in a common frame. The embodiments were chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A method for provisioning a location register over an internet protocol network, comprising:

receiving from an input device coupled to an internet protocol network a request to modify information in a location register;

converting the request into at least one HLR access message;

sending the at least one HLR access message to the location; and modifying information in the location register in response to the at least one HLR access message wherein the request is for obtaining a local number in a first service area for use for a predetermined time with a wireless station provisioned in a second service area.

2. A method according to claim 1, wherein the converting step is preformed on a server coupled to the internet protocol network and associated with receiving the request to modify information in the location register, and further comprising sending the at least one HLR access message using an internet protocol transport to gateway server with which the location register is in communication on before sending the at least one HLR access message to the location register.

3. A method according to claim 1, further comprising converting the HLR access message from the internet protocol transport to a message transfer part transport before sending the HLR access message to the location register.

4. A method according to claim 1, wherein the location register is coupled to the Internet, and wherein the converting step is preformed on a server coupled to the internet protocol network and associated with receiving the request to modify information in the location register, and further comprising sending the at least one HLR access message to the location register using the internet protocol transport.

5. A method according to claim 1, wherein the request comprises a mobile identification number, an activation time, a duration, and an originating device IP address.

6. A method according to claim 1, wherein the modifying step comprises assigning a local number for use by the wireless station when the wireless station is in the first service area.

7. A method according to claim 6, further comprising sending a message indicating the local number to the input device.

8. A method according to claim 1, wherein the at least one HLR access message comprises an IS-4I message.

9. A method according to claim 1, wherein the at least one HLR access message comprises a GSM MAP message.

10. A method for reducing charges associated with communications with a cellular subscriber station (CSS), comprising the steps of:

receiving a request to obtain a local number in a first service area for use for a predetermined time with a CSS provisioned in a second service area;

generating a message including the request and sending the message in an internet protocol (IP) format to a gateway server;

sending, from the gateway server, at least one HLR access message operable to request the local number to at least one of a location register and a mobile telephone switching office (MTSO) associated with the first service area in a message transfer part (MTP) format;

assigning a local number for use by the CSS when the CSS is in the first service area; and sending a message indicating the local number.

11. A method according to claim 10, wherein the message comprises the at least one HLR access message.

12. A method according to claim 10, further comprising receiving billing information associated with the wireless phone, and sending the billing information to the gateway server.

13. A method according to claim 12, further comprising sending the billing information to a billing application prior to sending the message indicating the local number.

14. A method according to claim 10, wherein the request is received via user input at a display device.

15. A method according to claim 14, wherein the message indicating the local number is communicated to the display device.

16. A method according to claim 10, wherein the predetermined time includes a service begin date and a service end date.

17. A method according to claim 10, further comprising provisioning a switch associated with the first service area to activate the local number for use by the CSS.

18. A method according to claim 10, wherein the at least one HLR access message comprises an IS-41 message.

19. A method according to claim 10, wherein the at least one HLR access message comprises a GSM MAP message.

20. A method according to claim 10, wherein the at least one HLR access message includes a mobile identification number, an activation time, a duration, and an originating device IP address.

21. A method for allocating a local number, comprising the steps of:

generating a message requesting a local number for use in a first service area by a wireless phone provisioned in a second service area;

sending the message in an internet protocol format to a gateway switch being operable to communicate with at least one of a location register and a MTSO associated with the first service area;

translating the message into at least one HLR access message;

sending the at least one HLR access message to the at least one of a location register and a MTSO; and receiving the local number from the at least one of a location register and a MTSO.

22. A system for reducing charges associated with communications with a cellular subscriber station (CSS), comprising:

a receiver operable to receive a request to obtain a local number in a first service area for use for a predetermined time with a CSS provisioned in a second service area;

a generator operable to generate a message including the request and communicate the message in an internet protocol (IP) format to a gateway server;

wherein the gateway server is operable to transmit at least one HLR access message to request the local number to at least one of a location register and a MTSO associated with the first service area in a message transfer part (MTP) format; wherein the at least one of a location register and a MTSO is operable to assign a local number for use by the CSS when the CSS is in the first service area; and a transmitter operable to transmit a message indicating the local number.

* * * * *